United States Patent [19]
Ilan et al.

[11] Patent Number: 5,809,465
[45] Date of Patent: *Sep. 15, 1998

[54] PATTERN RECOGNITION SYSTEM

[75] Inventors: Gabriel Ilan; Jacob Goldberger, both of Tel Aviv, Israel

[73] Assignee: Advanced Recognition Technology, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 625,651

[22] Filed: Mar. 29, 1996

[30]  Foreign Application Priority Data

Mar. 30, 1995 [IL] Israel ........................................ 113204

[51] Int. Cl.$^6$ ................................................. G10L 3/02
[52] U.S. Cl. ............................................. 704/241; 382/215
[58] Field of Search ................................. 704/241, 231, 704/236; 382/215, 209, 199

[56]    References Cited

U.S. PATENT DOCUMENTS

| | | | |
|---|---|---|---|
| 4,015,240 | 3/1977 | Swonger et al. | 340/146.3 |
| 4,384,273 | 5/1983 | Ackland et al. | 382/34 |
| 4,467,437 | 8/1984 | Tsuruta et al. | 704/241 |
| 4,488,243 | 12/1984 | Brown et al. | 704/241 |
| 4,509,187 | 4/1985 | Ackland et al. | 381/43 |
| 4,570,232 | 2/1986 | Shikano | 704/241 |
| 4,592,086 | 5/1986 | Watari et al. . | |
| 4,667,341 | 5/1987 | Watari . | |
| 4,742,547 | 5/1988 | Watanabe . | |
| 4,906,940 | 3/1990 | Greene et al. | 382/16 |
| 4,910,783 | 3/1990 | Nakagawa . | |
| 4,918,733 | 4/1990 | Daugherty | 381/43 |
| 4,977,603 | 12/1990 | Irie et al. | 382/34 |
| 5,121,465 | 6/1992 | Sakoe . | |
| 5,166,539 | 11/1992 | Uchimura et al. | 307/201 |
| 5,181,256 | 1/1993 | Kamiya | 382/14 |

(List continued on next page.)

OTHER PUBLICATIONS

Sakoe and Chiba, "Dynamic Programming Algorithm Optimization for Spoken Word Recognition", published by the *IEEE Transactions on Acoustics, Speech and Signal Processing*, Feb., 1978.

Furui, "Cepstral Analysis Techniques for Automatic Speaker Verification", published by the *IEEE Transactions on Acoustics. Speech and Signal Processing*, Apr. 1981.

Tohkura, "A Weighted Cepstral Distance Measure for Speech Recognition", *IEEE Transactions on Acoustics, Speech and Signal Processing*, Oct. 1987.

Makhoul, "Linear Prediction: A Tutorial Review", *Proceedings of the IEEE*, vol. 63, No. 4, Apr. 1975.

*Primary Examiner*—David R. Hudspeth
*Assistant Examiner*—Scott Richardson
*Attorney, Agent, or Firm*—Wilson Sonsini Goodrich & Rosati

[57]    ABSTRACT

A pattern recognition method of dynamic time warping of two sequences of feature sets onto each other is provided. The method includes the steps of creating a rectangular graph having the two sequences on its two axes, defining a swath of width r, where r is an odd number, centered about a diagonal line connecting the beginning point at the bottom left of the rectangle to the endpoint at the top right of the rectangle and also defining r−1 lines within the swath. The lines defining the swath are parallel to the diagonal line. Each array element k of an r-sized array is associated with a separate array of the r lines within the swath and for each row of the rectangle, the dynamic time warping method recursively generates new path values for each array element k as a function of the previous value of the array element k and of at least one of the current values of the two neighboring array elements k−1 and k+1 of the array element k. The latter step of recursively generating new path values is repeat for all of the rows of the rectangle and the value of the middle array element is selected as the output value sought.

10 Claims, 5 Drawing Sheets

U.S. PATENT DOCUMENTS

| | | | |
|---|---|---|---|
| 5,323,471 | 6/1994 | Hayashi | 382/15 |
| 5,459,798 | 10/1995 | Bailey et al. | 382/218 |
| 5,491,760 | 2/1996 | Withgott et al. | 382/203 |
| 5,640,466 | 6/1997 | Huttenlocher et al. | 382/177 |
| 5,682,464 | 10/1997 | Sejnoha | 704/241 X |

OTHER PUBLICATIONS

Matsuura et al, "Word Recognition Using a Neural Network and a Phonetically Based DTW", published by the *IEEE Neural Networks for Signal Processing IV. Proceedings of the 1994 IEEE Workshop,* issued Sep. 1994, pp. 329–334.

PATTERN RECOGNITION SYSTEM

FIELD OF THE INVENTION

The present invention relates generally relates to pattern recognition systems, and in particular, to pattern recognition systems using a weighted cepstral distance measure.

BACKGROUND OF THE INVENTION

Pattern recognition systems are used, for example, for the recognition of characters and speech patterns.

Pattern recognition systems are known which are based on matching the pattern being tested against a reference database of pattern templates. The spectral distance between the test pattern and the database of reference patterns is measured and the reference pattern having the closest spectral distance to the test pattern is chosen as the recognized pattern.

An example of the prior art pattern recognition system using a distance measure calculation is shown in FIGS. 1, 2 and 3, to which reference is now made. FIG. 1 is a flow chart illustrating the prior art pattern recognition system for speech patterns using a conventional linear predictor coefficient (LPC) determiner and a distance calculator via dynamic time warping (DTW). FIG. 2 illustrates the relationship between two speech patterns A and B, along i-axis and j-axis, respectively. FIG. 3 illustrates the relationship between two successive points of pattern matching between speech patterns A and B.

Referring to FIG. 1, the audio signal 10 being analyzed, has within it a plurality of speech patterns. Audio signal 10 is digitized by an analog/digital converter 12 and the endpoints of each speech pattern are detected by a detector 14. The digital signal of each speech pattern is broken into frames and for each frame, analyzer 16 computes the linear predictor coefficients (LPC) and converts them to cepstrum coefficients, which are the feature vectors of the test pattern. Reference patterns, which have been prepared as templates, are stored in a database 18. A spectral distance calculator 20 uses a dynamic time warping (DTW) method to compare the test pattern to each of the reference patterns stored in database 18. The DTW method measures the local spectral distance between the test pattern and the reference pattern, using a suitable method of measuring spectral distance, such as the Euclidean distance between the cepstral coefficients or the weighted cepstral distance measure. The template whose reference pattern is closest in distance to the analyzed speech pattern, is then selected as being the recognized speech pattern.

In a paper, entitled "Dynamic Programming Algorithm Optimization for Spoken Word Recognition", published by the *IEEE Transactions on Acoustics. Speech and Signal Processing* in February 1978, Sakoe and Chiba reported on a dynamic programming (DP) based algorithm for recognizing spoken words. DP techniques are known to be an efficient way of matching speech patterns. Sakoe and Chiba introduced the technique known as "slope constraint", wherein the warping function slope is restricted so as to discriminate between words in different categories.

Numerous spectral distance measures have been proposed including the Euclidean distance between cepstral coefficients which is widely used with LPC-derived cepstral coefficients. Furui in a paper, entitled "Cepstral Analysis Techniques for Automatic Speaker Verification", published by the *IEEE Transactions on Acoustics. Speech and Signal Processing* in April 1981, proposed a weighted cepstral distance measure which further reduces the percentage of errors in recognition.

In a paper, entitled "A Weighted Cepstral Distance Measure for Speech Recognition", published by the *IEEE Transactions on Acoustics. Speech and Signal Processing* in October 1987, Tahkura proposed an improved weighted cepstral distance measure as a means to improve the speech recognition rate.

Referring now to FIG. 2, the operation of the DTW method will be explained. In FIG. 2., speech patterns A and B are shown along the i-axis and j-axis, respectively. Speech patterns A and B are expressed as a sequence of feature vectors $a_1, a_2, a_3 \ldots a_m$ and $b_1, b_2, b_3 \ldots b_m$, respectively.

The timing differences between two speech patterns A and B, can be depicted by a series of 'points' $Ck(i,j)$. A 'point' refers to the intersection of a frame i from pattern A to a frame j of pattern B. The sequence of points C1, C2, C3 ... Ck represent a warping function 30 which effects a map from the time axis of pattern A, having a length m, on to the time axis of pattern B, having a length n. In the example of FIG. 2, function 30 is represented by points c1(1,1), c2(1,2), c3(2,2), c4(3,3), c5(4,3) ... ck(n,m). Where timing differences do not exist between speech patterns A and B, function 30 coincides with the 45 degree diagonal line (j=i). The greater the timing differences, the further function 30 deviates from the 45 degree diagonal line.

Since function 30 is a model of time axis fluctuations in a speech pattern, it must abide by certain physical conditions. Function 30 can only advance forward and cannot move backwards and the patterns must advance together. These restrictions can be expressed by the following relationships:

$$i(k)-i(k-1) \leq 1 \text{ and } j(k)-j(k-1) \leq 1;$$

and $$i(k-1) \leq i(k) \text{ and } j(k-1) \leq j(k) \qquad (1)$$

Warping function 30 moves one step at a time from one of three possible directions. For example, to move from C3(2,2) to C4(3,3), function 30 can either move directly in one step from (2,2) to (3,3) or indirectly via the points at (2,3) or (3,2).

Function 30 is further restricted to remain within a swath 32 having a width r. The outer borders 34 and 36 of swath 32 are defined by (j=i+r) and (j =i-r), respectively.

A fourth boundary condition is defined by:

$$i(1)=1, j(1)=1, \text{ and } i(end)=m, j(end)=n.$$

Referring now to FIG. 3, where, for example, the relationship between successive points $C10_{(10,10)}$ and $C11_{(11,11)}$, of pattern matching between speech patterns A and B is illustrated. In accordance with the conditions as described hereinbefore, there are three possible ways to arrive at point $C11_{(11,11)}$, that is, either directly from $C10_{(10,10)}$ to $C11_{(11,11)}$, indicated by line 38 or from $C10_{(10,10)}$ via point $_{(11,10)}$ to $C11_{(11,11)}$ indicated by lines 40 and 42, or thirdly from $C10_{(10,10)}$ via point $_{(10,11)}$ to $C11_{(11,11)}$, indicated by lines 44 and 46.

Furthermore, associated with each arrival point (i,j), such as point C11 $_{(11,11)}$, is a weight $W_{ij}$, such as the Euclidean or Cepstral distance between the ith frame of pattern A and the jth frame of pattern B. By applying a weight $W_{ij}$ to each of indirect paths 40, 42, 44 and 46 and a weight of $2W_{ij}$ to direct path 38, the path value $S_{ij}$, at the point (i,j) can be recursively ascertained from the equation:

$$S_{ij} = \min \begin{pmatrix} 2W_{ij} + S_{i-1,j-1}, \\ W_{ij} + S_{i,j-1}, \\ W_{ij} + S_{i-1,j} \end{pmatrix} \quad (2)$$

In order to arrive at endpoint $S_{nm}$, it is necessary to calculate the best path value $S_{ij}$ at each point. Row by row is scanned and the values of $S_{ij}$ for the complete previous row plus the values of the present row up to the present point are stored. The value for Snm is the best path value.

SUMMARY OF THE INVENTION

It is thus the general object of the present invention to provide an improved pattern recognition method.

According to the invention there is provided a method of dynamic time warping of two sequences of feature sets onto each other. The method includes the steps of creating a rectangular graph having the two sequences on its two axes, defining a swath of width r, where r is an odd number, centered about a diagonal line connecting the beginning point at the bottom left of the rectangle to the endpoint at the top right of the rectangle and also defining r−1 lines within the swath. The lines defining the swath are parallel to the diagonal line. Each array element k of an r-sized array is associated with a separate array of the r lines within the swath and for each row of the rectangle, the dynamic time warping method recursively generates new path values for each array element k as a function of the previous value of the array element k and of at least one of the current values of the two neighboring array elements k−1 and k+1 of the array element k. The latter step of recursively generating new path values is repeat for all of the rows of the rectangle and the value of the middle array element is selected as the output value sought.

Furthermore, according to the invention there is provided a method of dynamic time warping of two sequences of feature sets onto each other where the first sequence set has a length L1 and the second sequence set having a length L2 and L1 being greater than L2. The method includes the steps of creating a rectangular graph having the first longer sequence on its horizontal axis and the second sequence on its vertical axis, defining a swath of width r, where r is an odd number, centered about a diagonal line connecting the beginning point at the bottom left of the rectangle to the endpoint at the top right of the rectangle and also defining r−1 lines, which are parallel to the diagonal line within the swath. The method further includes the steps of associating each array element k of an r-sized array with a separate array of the r lines within the swath and for each row of the rectangle, recursively generating new path values for each array element k as a function of the previous value of array element k and of at least one of the current values of the two neighboring array elements k−1 and k+1. The latter step is repeated for all of the rows of the rectangle. For every L1/(L1−L2) rows of the rectangle, a new path value for an array element k=max(k)+1 of the array element k is also generated and for each of the array elements k, the new path values are replaced by the value of its neighboring array element k+1. The value of the middle array element is selected as the output value sought.

Furthermore, in accordance with a preferred embodiment of the invention, the step of selecting the output value is replaced by the step of selecting, as output, the smallest value stored in the array elements and the array element number associated therewith.

Furthermore, in accordance with a preferred embodiment of the invention, the feature sets have integer values.

Additionally, in accordance with a preferred embodiment of the invention, the step of defining a swath of width r, is replaced by the step of defining a swath connecting the beginning point at the top right of the rectangle to the endpoint at the bottom left of the rectangle.

Furthermore, in accordance with a preferred embodiment of the invention, there is provided a method of pattern recognition including the steps of generating feature sets, having floating points, of a set of reference patterns, normalizing the feature sets by their standard deviations across the set of reference patterns and selecting only the integer portions of the result, storing the portions as integer feature sets for the reference patterns, for every input pattern, generating a feature set and formatting an integer value in accordance with the step normalizing the feature sets by their standard deviations described above and comparing the integer feature sets of the input pattern to at least one of the integer feature sets of the reference patterns.

Additionally, in accordance with a preferred embodiment of the invention, the step of formatting an integer value includes the steps of calculating the average value of the input patterns, calculating the standard deviation of each of the feature sets, dividing each of the feature sets by the calculated standard deviation and multiplying by a factor q and calculating the integer value.

BRIEF DESCRIPTION OF THE DRAWINGS

The present invention will be understood and appreciated more fully from the following detailed description taken in conjunction with the accompanying drawings in which.

DETAILED DESCRIPTION OF A PREFERRED EMBODIMENT

Figure 4:
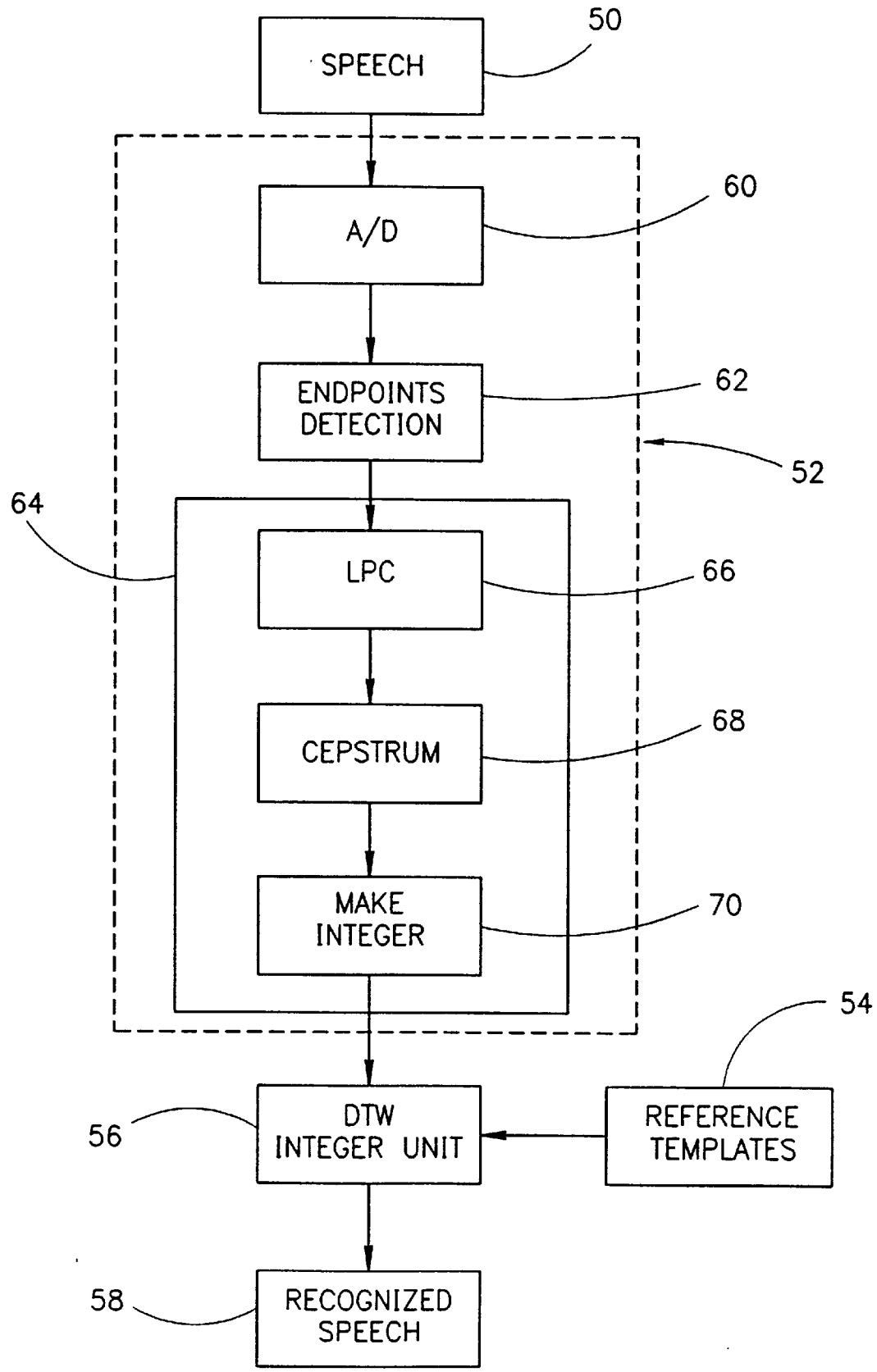
FIG. 4 is a flow chart illustration of a distance fan pattern recognition system, constructed and operative in accordance with a preferred embodiment of the present invention.

Reference is now made to FIG. 4 which is a flow chart representation of the distance pattern recognition system (DPR), constructed and operative in accordance with a preferred embodiment of the present invention. The following description relates to audio or speech patterns, though it should be understood that the present invention is not restricted thereto and can apply to any kind of pattern.

The DPR system converts the audio pattern 50 to be analyzed, into a feature set in an integer format, using a processor, generally designated 52. The integer feature set for the test pattern is then compared with a database 54 containing reference patterns, by measuring the spectral distance between the test pattern and each reference pattern, using dynamic time warping (DTW) by the DTW unit 56. The reference pattern which is closest to the test pattern, is then selected as the recognized speech pattern 58. It should be noted that integer format requires less storage space than floating point format.

Processor 52 digitizes audio pattern 50 using an analog/digital converter 60 and then detects the endpoints of each audio pattern 50 using detector 62. The output is an audio word. Processor 52 breaks the word into frames and then extracts the features of each frame via a feature extractor, generally designated 64. Feature extractor 64 comprises a linear prediction coefficient (LPC) calculator 66, a cepstrum converter 68 and an integer formatter 70. LPC calculator 66 computes the linear prediction coefficients (LPC) for each frame. Cepstrum converter 68 converts the LPC coefficients of each frame into a set of cepstrum coefficients. Finally integer formatter 70 normalizes and converts the cepstrum coefficients of each frame into integer format. The integer coefficients are the feature set of the frame. Database 54 comprises reference patterns, which have been previously prepared, using the process hereinbefore described.

Prior to operation, for each cepstrum coefficient, D1, D2, etc. in the feature sets of the database, integer formatter 70 calculates its average value and the standard deviation. Then, for each cepstrum coefficient in each feature set (whether of the reference database or of an incoming feature set), integer formatter 70 divides each cepstrum coefficient $D_1$ by its associated standard deviation $\sigma_1$, multiplies the result by a factor q and saves the integer portion of the result. The constant q is any number which results in the integer portions for all the cepstrum coefficients being within a range of $-100$ to $+100$. Thus, the integer coefficient does not require storage of more than one byte of 8 bits. Using integer formatter 70 enables the full dynamic range of the resolution to be used.

Thus, for example, for five $D_1$ cepstrum coefficients 5.2, $-4.0$, 5.4, 6.4, and 20, the standard deviation $\rho$ is 6.6513. If q=20, dividing each cepstrum coefficient by $\sigma$ results in values of 15.64, $-12.03$, 16.23, 19.24 and 60.14, respectively. The integer coefficients are thus 15, $-12$, 16, 19 and 60, respectively.

Figure 1:
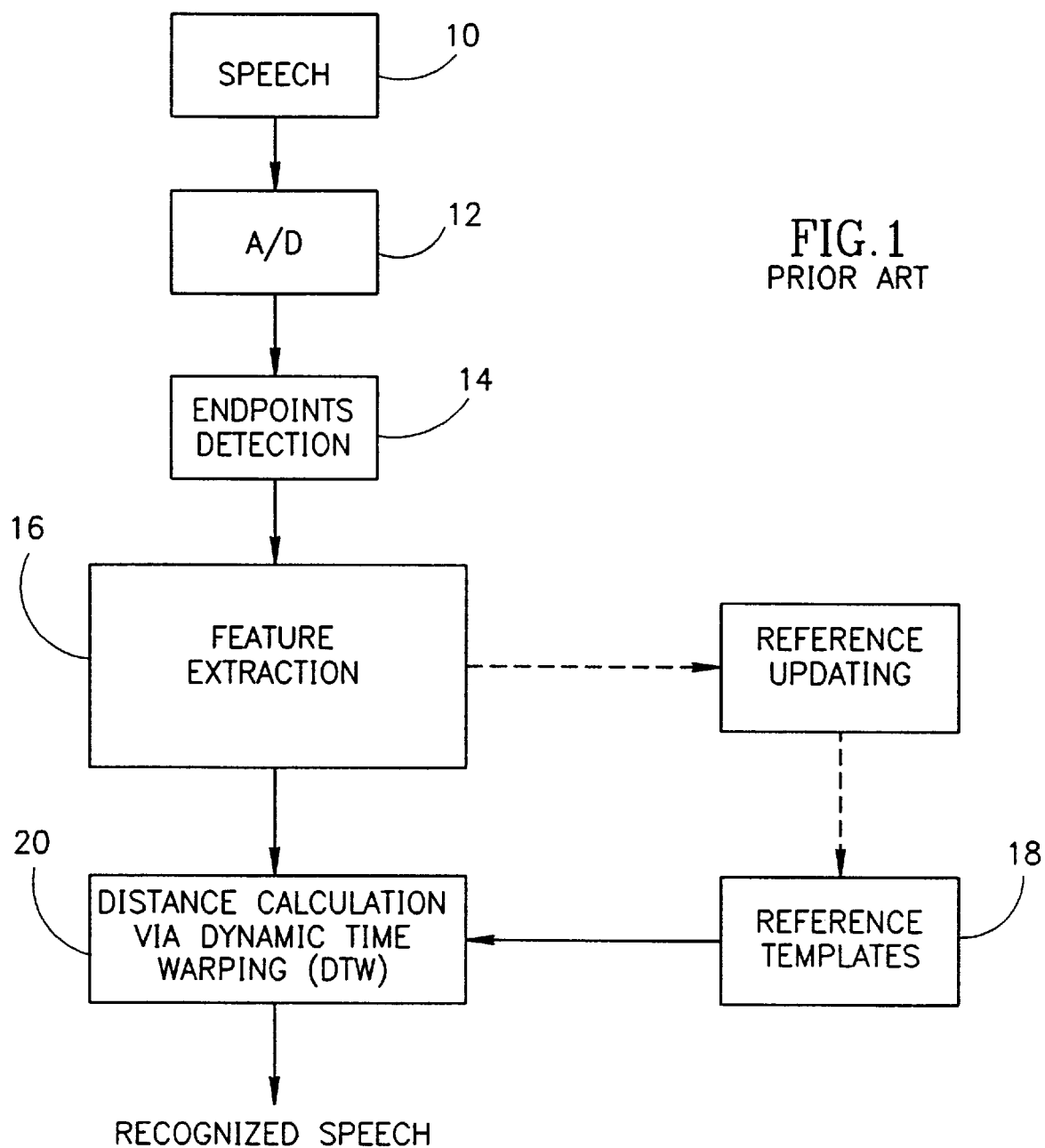
FIG. 1 is a flow chart illustration of a prior art pattern recognition system using a conventional cepstrum coefficients and a distance calculator via dynamic time warping (DTW).
Figure 2:
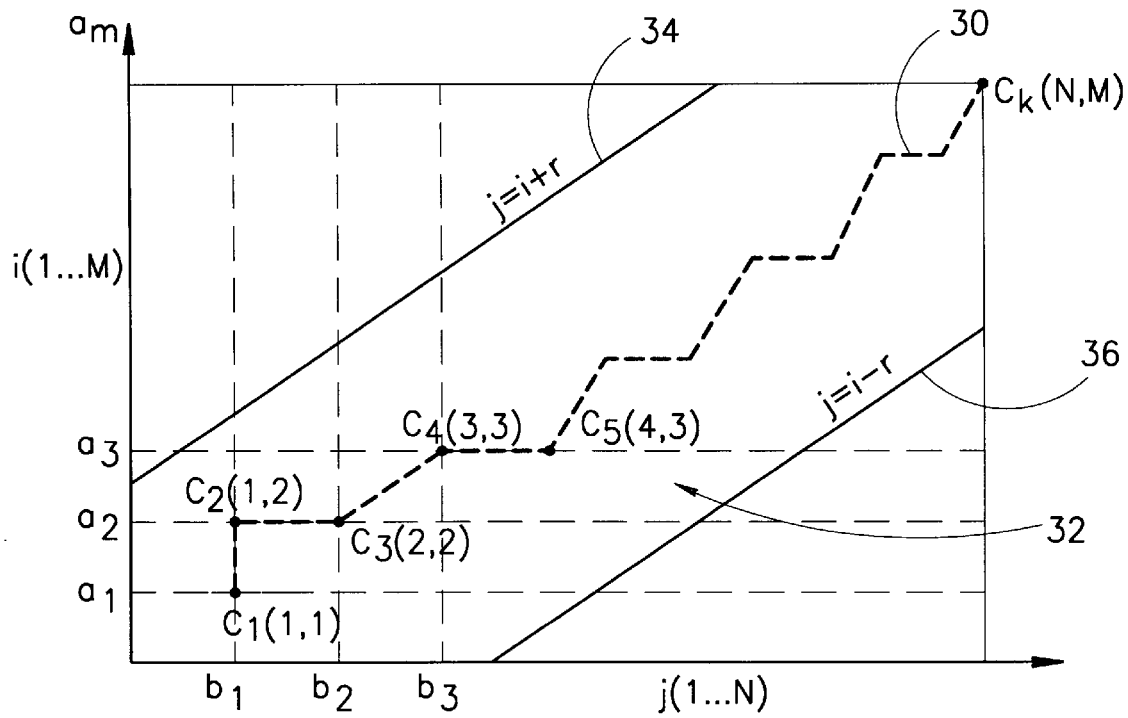
FIG. 2 is a schematic illustration of the relationship between two speech patterns A and B, along i-axis and j-axis, respectively, in accordance with the prior art.
Figure 3:
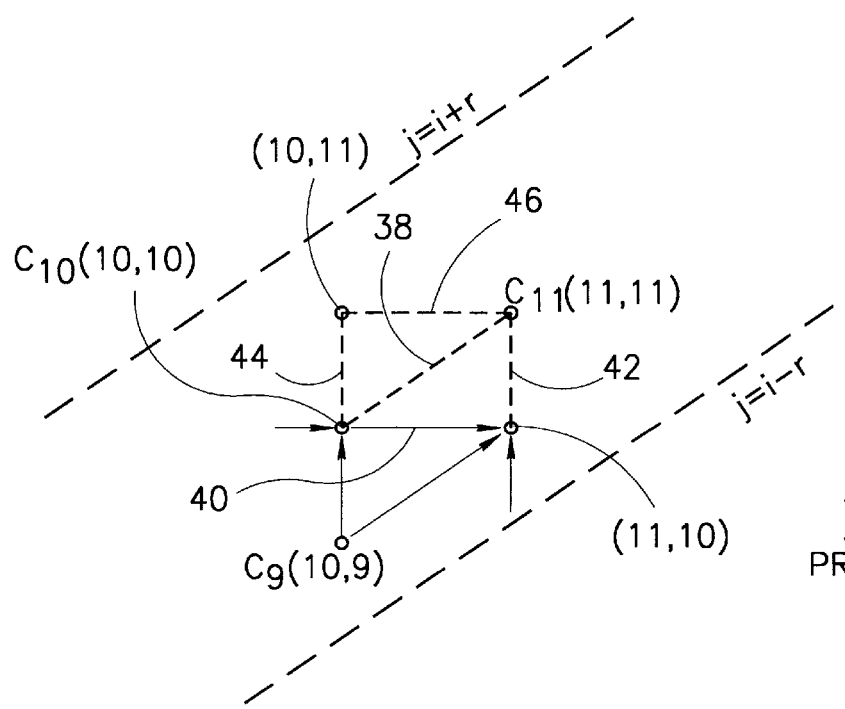
FIG. 3 is a schematic illustration of the relationship between two successive points of pattern matching between the two speech patterns A and B.
Figure 5:
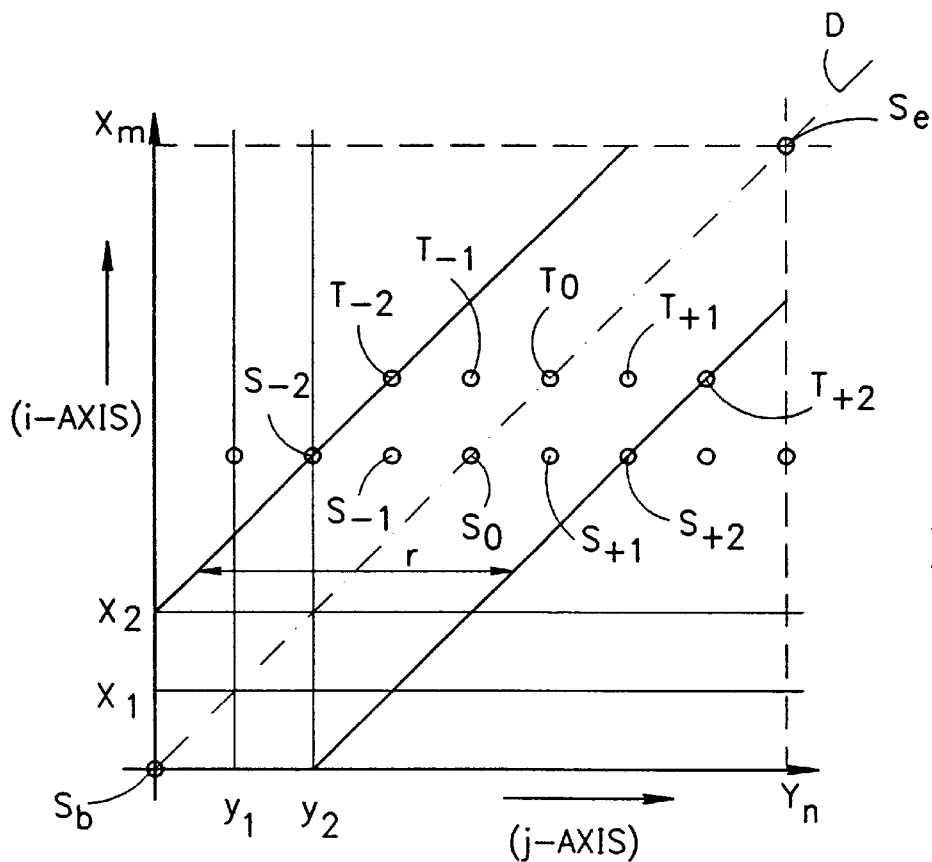
FIG. 5 is a schematic illustration of the relationship between two speech patterns X and Y, of approximately equal length, along the i-axis and j-axis, respectively.

Reference is now made to FIG. 5 which is a schematic illustration of the relationship between two audio patterns X and Y, of equal length, along i-axis and j-axis, respectively. Patterns X and Y have a sequence of frames associated with which are integer feature vectors, designated $x_1, x_2, \ldots x_m$ and $y_1, y_2, \ldots y_n$, respectively. FIG. 5 is useful for understanding the operation of the DTW unit 56 and is similar to FIG. 2.

For identical speech patterns, that is, where timing differences do not exist, the warping function F coincides with a 45 degree diagonal line D (where x=y). The warping function approximates to the 45 degree diagonal line D. The DTW unit of the present invention scans row by row through a swath of width r.

In the present invention, the points in a scan row are labeled $S_p$ where p is defined by: $-r/2 \leq p \leq +r/2$ (4)

Thus, for example, for a swath width of r=5, p is $-2, -10, +1$ or $+2$. Thus, each line contains five points, designated $S_{-2}, S_{-1}, S_0, S_{+1}$ and $S_{+2}$, centered about point $S_0$ which lies on the ideal diagonal line D. The beginning and end of the path through space of FIG. 5 are represented by Sb and Se and also lie on diagonal line D.

It is a feature of the present invention that DTW unit 56 measures the spectral distance between the test pattern X and the reference pattern Y by calculating the best path value $S_p$ at each point centered about $S_0$.

As hereinbefore described with respect to the prior art, weightings can be applied to the distance measurements. Any weighing formulation can be utilized. A weight Wij is applied to the indirect paths and a weight of 2Wij is applied to the direct path.

It is noted that since p is centered about the diagonal line D, j=i+p.

At point $T_0$, the path values which are used for calculating the best value at $T_0$ are along direct path $S_0$ and indirect paths, $T_{-1}$ and $S_{+1}$. Similarly, at point $T_{+1}$, the path values which are used for calculating the best value at $T_{+1}$, are $T_0$, $S_{+1}$ and $S_{+2}$. Thus, at point $T_0$, the path values which need to be retained for calculating subsequent best values are $S_0$, $S_{+1}, S_{+2}, T_{-2}$ and $T_{-1}$.

It is noted that, in the case of the present invention, once the best path value for $T_0$ is calculated, the value $S_0$ is no longer required and the value $T_0$ can be stored 'in place' of $S_0$. Thus, at point $T_{+1}$, the path values which are required for calculating the best value can be rewritten as $S_0, S_{+1}$ and $S_{+2}$ where $S_0$ is the 'new' value which equals the value for $T_0$. Similarly, the values $T_{-1}$ and $T_{-2}$ are stored 'in place' of $S_{-2}$ and $S_{-1}$, respectively. The final value of $S_0$ for endpoint Se yields the required path value for the test pattern X, vis-a-vis the reference pattern Y.

The above description can be written recursively as equation:

$$S_p = \min \begin{matrix} (S_p + 2W_{i,i+p}, \\ S_{p-1} + W_{x,x+p}, \\ S_{p+1} + W_{x,x+p}) \end{matrix} \quad (3)$$

For test audio pattern X, having a length m, the best path value $S_k$ to arrive at any point $S_{x,y}$ for $x=1 \ldots m$, is the minimum distance of three possibilities. Points outside the swath, that is, for $k>r+2$ or $k<k-2$, equal infinity.

In summary, the only values which need to be stored for subsequent calculations of best path values are the path values for $S_{-2}, S_{-1}, S_0, S_{+1}$ and $S+2$.

Figure 6:
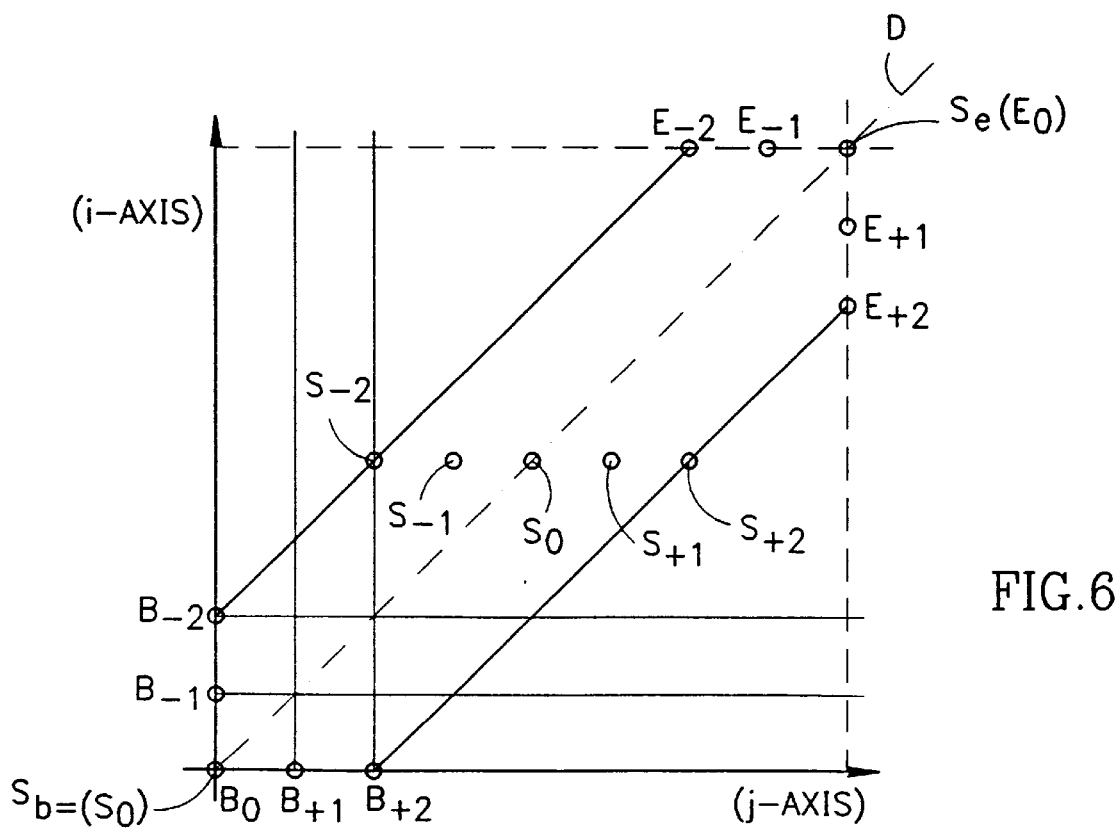
FIG. 6 is a schematic illustration detail of the end and start points, between two speech patterns X and Y, respectively.

Reference is now made to FIG. 6 which schematically details the end and start points, Se and Sb, respectively between two patterns X and Y, respectively.

The startpoint Sb which lies on the diagonal line D is assumed to have a path value $S_0$ and similarly the final best value for $S_0$ coincides with endpoint Se. When endpoint Se is reached, the final five values retained ($S_{-2}, S_{-1}, S_0, S_{+1}$ and $S_{+2}$) refer to the five points, designated $E_{-2}, E_{-1}, E_0, E_{+1}$ and $E_{+2}$, along the boundary of the warping function. Since $r/2=2$ and the warping function follows a 45 degree line, the last row only contains the path values $E_{-2}, E_{-1}$ and $E_0$. All other points in the row would have to utilize points outside the swath, which is not allowed. The previous row retains the value of $E_{+1}$, which has not been overwritten, since the new path values for the last row are outside the swath. Similarly, the value stored in $E_{+2}$ refers to the second to last row.

Since the endpoint detector 62 may have incorrectly selected the endpoints of the audio pattern, the start and end points, Sb and Se, respectively, are not necessarily correct. Therefore, even if the startpoint Sb is known, the final value of $S_0$ corresponding with endpoint Se may not accurately reflect the end point and may not have the best path value.

If the endpoint Se is known and the startpoint Sb is unknown, the best path value process, described hereinabove, can be carried out in reverse. Thus, the final path value for Sb is the best of the five boundary values $B_{-2}$, $B_{-1}$, $B_0$, $B_{+1}$ and $B_{+2}$, illustrated.

If the best overall path value is found to be $E_{+1}$, for example, the assumed length for the test pattern is shorter than previously and thus is not equal in length to the reference pattern. Thus, the path values for $E_{-2}$, $E_{-1}$, $E_0$, $E_{+1}$ and $E_{+2}$ have to be normalized by their path lengths and only then compared.

If neither start nor end points are known, the startpoint Sb is assumed with a value $S_0$ and the final best path value (one of the five values $E_{-2}$, $E_{-1}$, $E_0$, $E_{+1}$ and $E_{+2}$) is found. The point having the best total path value is then taken as the startpoint and the process carried out in reverse to find the best path value for Sb. Therefore, in accordance with the present invention, the path value for the reference pattern is the best path value from among the boundary path values $B_{-2}$, $B_{-1}$, $B_0$, $B_{+1}$ and $B_{+2}$.

Figure 7:
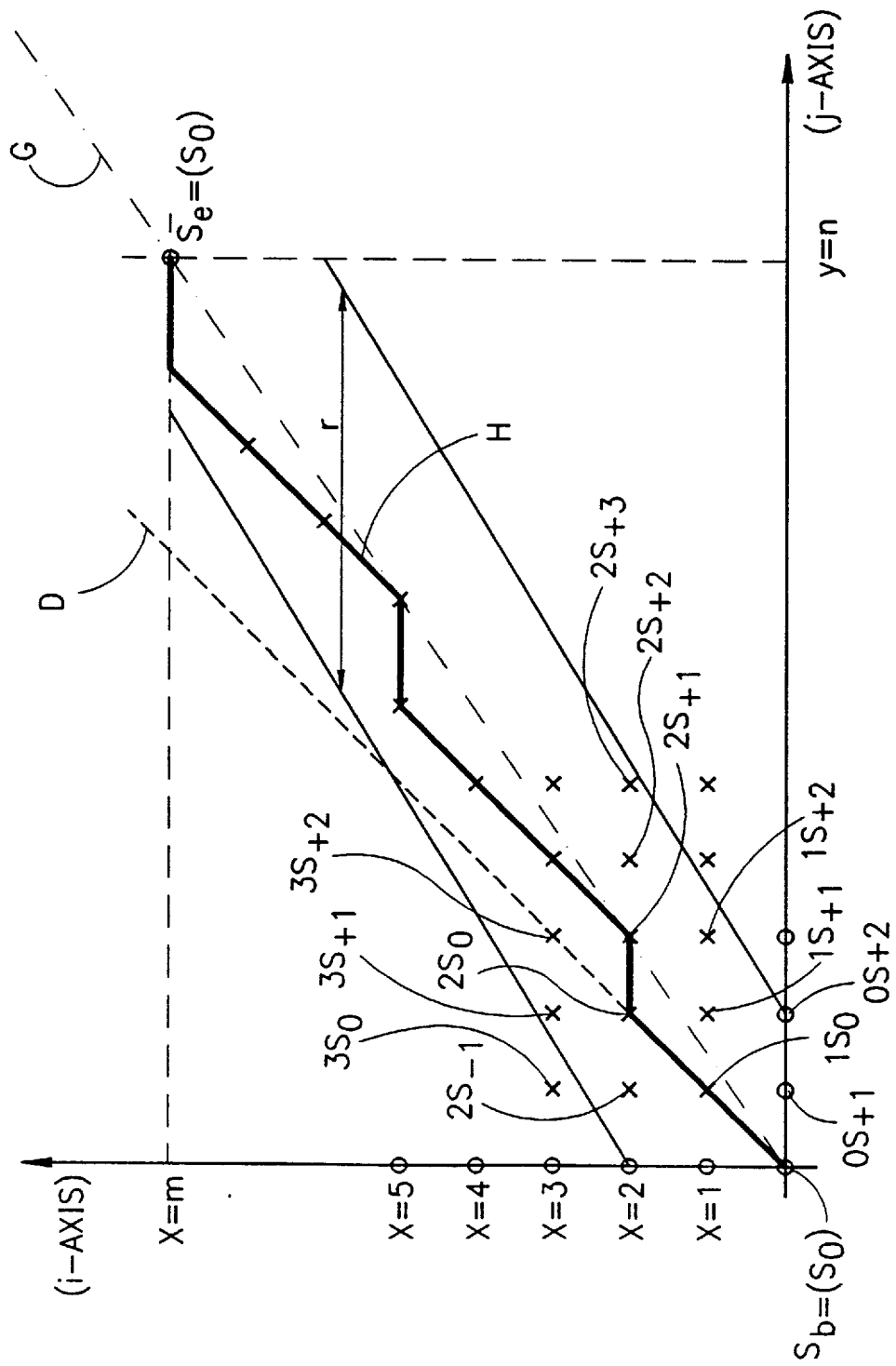
FIG. 7 is a schematic illustration of the relationship between two speech patterns X and Y, of unequal lengths.

Reference is now made to FIG. 7 which is a schematic illustration of the relationship between two audio patterns X and Y, of unequal length, along the i-axis and j-axis, respectively. The relationship between the lengths of X and Y is shown, for example, as being 8:12 (2:3). That is pattern Y is 1.5 times longer than pattern X.

For non-identical speech patterns, the straight line G, connecting the start and end points Sb and Se, respectively, does not coincide with the 45 degree diagonal line D, shown dashed. In the example of FIG. 7, path values coincide with line G only every third row. That is, points i=2,j=3 and i=5,j=7 lie on line G.

The path values $S_{-2}$, $S_{-1}$, $S_0$, $S_{+1}$ and $S_{+2}$ are shown for each of rows x=1, x=2 and x=3. Each group of path values is designated with a prefix indicating the row, such as the prefix "1" for x=1. Thus, path values $1S_{-2}$, $1S_{-1}$, $1S_0$, $1S_{+1}$ and $1S_{+2}$ refer to the row x=1.

The best path value process is carried out as described hereinbefore for patterns of equal length. Thus, startpoint Sb assumes a value of $S_0$. Values are calculated for each row. Every z rows, where z=n/(n-m), it is necessary to adjust for the inequality of the test pattern lengths. In the example, where z=3 {12/(12-8)}, an extra path value $S_{+3}$ is calculated every third row. Thus, for the first two rows (x=0 and x=1), the five Sk values ($S_{-2}$, $S_{-1}$, $S_0$, $S_{+1}$ and $S_{+2}$) are calculated, as hereinbefore described. For the third row, an extra value for $2S_{+3}$ is calculated. Then value $2S_{-2}$ is discarded and the value for $2S_{-1}$ is stored 'in place' of $2S_{-2}$. Similarly, each of the stored values, $2S_0$, $2S_{+1}$, $2S_{+2}$ and $2S_{+3}$ are stored 'in place' of their neighbors, $2S_{-1}$, $2S_0$, $2S_{+1}$ and $2S_{+2}$, respectively.

Every z rows, the path value stored in $S_0$ 'jumps' back on track and coincides with the straight line G. Thus, in the example, a 'jump' is made on rows x=2, x=5 and final row x=8. The final value of $S_0$ will then coincide with the endpoint Se and yield the total path value for the two patterns.

The path values for patterns of unequal length may be represented by the following equation:

$$S_k = \min \begin{pmatrix} S_k + 2W_{x,x+k+l}, \\ S_{k-1} + W_{x,x+k+l}, \\ S_{k+1} + W_{x,x+k+l} \end{pmatrix} \quad (4)$$

where: l=number of 'jumps' performed to date, which is updated every z rows and z=n/(n-m).

The track of the path value $S_0$ is shown by double line H.

As will be appreciated by persons knowledgeable in the art, the various embodiments hereinbefore referred to, are given by way of example only and do not in any way limit the present invention.

Those skilled in the art will be readily appreciate that various changes, modifications and variations may be applied to the preferred embodiments without departing from the scope of the invention as defined in and by the appended claims.

We claim:

1. A method of dynamic time warping of two sequences of feature sets onto each other, the method comprising the steps of:

a. creating a rectangular graph having the two sequences on its two axes;

b. defining a swath of width r, where r is an odd number, centered about a diagonal line connecting the beginning point at the bottom left of the rectangle to the endpoint at the top right of the rectangle;

c. also defining r-1 lines within said swath, said lines being parallel to said diagonal line;

d. associating each array element k of an r-sized array with a separate array of the r lines within said swath;

e. for each row of said rectangle, recursively generating new path values for each array element k as a function of the previous value of said array element k and of at least one of the current values of the two neighboring array elements k-1 and k+1 of said array element k;

f. repeating step e) for all of the rows of said rectangle;

g. selecting, as output, the value of the middle array element.

2. A method according to claim 1 and wherein said step of selecting is replaced by the step of selecting, as output, the smallest value stored in the array elements and the array element number associated therewith.

3. A method according to claim 1 and wherein said function is defined by the equation:

$$S_k = \min \begin{pmatrix} (S_k + 2W_{i,i+k}, \\ S_{k-1} + W_{x,x+k}, \\ S_{k+1} + W_{x,x+k}) \end{pmatrix}$$

where $W_{i,i+k}$ is the distance between the ith frame of the first sequence and the jth frame of second sequence.

4. A method according to claim 1 and wherein said feature sets have integer values.

5. A method according to claim 1 and wherein said step of defining a swath of width r, is replaced by the step of defining a swath connecting the beginning point at the top right of the rectangle to the endpoint at the bottom left of the rectangle.

6. A method of dynamic time warping of a first and second sequence of feature sets onto each other, said first sequence set having a length L1, said second sequence set having a length L2 and L1 being greater than L2, the method comprising the steps of:

a. creating a rectangular graph having said first sequence on its horizontal axis and said second sequence on its vertical axis;

b. defining a swath of width r, where r is an odd number, centered about a diagonal line connecting the beginning point at the bottom left of the rectangle to the endpoint at the top right of the rectangle;

c. also defining r-1 lines within said swath, said lines being parallel to said diagonal line;

d. associating each array element k of an r-sized array with a separate array of the r lines within said swath;

e. for each row of said rectangle, recursively generating new path values for each array element k as a function of the previous value of said array element k and of at least one of the current values of the two neighboring array elements k−1 and k+1 f. repeating step e) for all of the rows of said rectangle;
g. for every L1/(L1−L2) rows of said rectangle:
 i. performing step e);
 ii. generating a new path value for an array element k=max(k)+1 of said array element k; and
 iii. replacing each the new path values from step i) for each of said array elements k by the value of its neighboring array element k+1;
h. selecting, as output, the value of the middle array element.

7. A method according to claim 6 and wherein said step of selecting is replaced by the step of selecting, as output, the smallest value stored in the array elements and the array element number associated therewith.

8. A method according to claim 6 and wherein said function is defined by the equation:

$$S_k = \min \begin{pmatrix} S_k + 2W_{i,i+k}, \\ S_{k-1} + W_{x,x+k}, \\ S_{k+1} + W_{x,x+k} \end{pmatrix}$$

where $W_{i,i+k}$ is the distance between the ith frame of the first sequence and the jth frame of second sequence.

9. A method according to claim 6 and wherein said feature sets have integer values.

10. A method according to claim 6 and wherein said step of defining a swath of width r, is replaced by the step of defining a swath connecting the beginning point at the top right of the rectangle to the endpoint at the bottom left of the rectangle.

* * * * *